United States Patent
Yamashina et al.

(10) Patent No.: US 11,343,119 B2
(45) Date of Patent: May 24, 2022

(54) DISTRIBUTED CONTROL SYSTEM AND COMMUNICATION CONTROL METHOD THEREFOR

(71) Applicant: Hitachi High-Tech Corporation, Tokyo (JP)

(72) Inventors: Kazushi Yamashina, Tokyo (JP); Terunobu Funatsu, Tokyo (JP); Takashi Saegusa, Tokyo (JP); Masahiro Ohashi, Tokyo (JP); Yoshiro Gunji, Tokyo (JP); Yuuichi Hagino, Tokyo (JP); Yutaka Kasai, Tokyo (JP); Tsukasa Sugawara, Tokyo (JP); Junichi Kitamura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 16/970,585

(22) PCT Filed: Jan. 15, 2019

(86) PCT No.: PCT/JP2019/000868
§ 371 (c)(1),
(2) Date: Aug. 17, 2020

(87) PCT Pub. No.: WO2019/171762
PCT Pub. Date: Sep. 12, 2019

(65) Prior Publication Data
US 2021/0111924 A1     Apr. 15, 2021

(30) Foreign Application Priority Data

Mar. 9, 2018  (JP) .............................. JP2018-043409

(51) Int. Cl.
*H04L 12/44*     (2006.01)
*H04L 12/403*    (2006.01)
(Continued)

(52) U.S. Cl.
CPC ............ *H04L 12/44* (2013.01); *H04L 12/403* (2013.01); *H04L 12/42* (2013.01); *H04L 41/12* (2013.01)

(58) Field of Classification Search
CPC ....... H04L 12/44; H04L 12/403; H04L 41/12; H04L 43/0811; H04L 45/42; H04L 45/66; H04L 49/15; H04L 63/0485
See application file for complete search history.

(56) References Cited

U.S. PATENT DOCUMENTS 4,347,563 A * 8/1982 Paredes .............. G05B 19/0428
                                                             700/8
2003/0217177 A1* 11/2003 Gulati ................... H04L 49/252
                                                            709/238
(Continued)

FOREIGN PATENT DOCUMENTS

CN      102164060 A      8/2011
CN      105270945 A      1/2016
(Continued)

OTHER PUBLICATIONS

International Search Report (PCT/ISA/210) issued in PCT Application No. PCT/JP2019/000868 dated Apr. 2, 2019 with English translation (five (5) pages).
(Continued)

*Primary Examiner* — Glenton B Burgess
*Assistant Examiner* — Rachel J Hackenberg
(74) *Attorney, Agent, or Firm* — Crowell & Moring LLP

(57) ABSTRACT

In the present invention, device information is collected while real-time performance and high-speed performance of control-related normal communication are maintained. The distributed control system has: a central processing device; a central communication device; multiple terminal communication devices each having at least one controlled device
(Continued)

connected thereto; an information storage device; and a network having a tree structure comprising multiple communication paths between the central communication device and the terminal communication devices, between the terminal communication devices, and between the terminal communication devices and the information storage device. The network is provided with a first communication path for connecting the upstream-side communication port of a terminal communication device with the downstream-side communication port of a terminal communication device and for connecting the upstream-side communication port of a terminal communication device with the normal communication port of the central communication device; and a second communication path for connecting between the downstream-side communication ports of terminal communication devices positioned at edges of the network and for connecting the downstream-side communication ports of the terminal communication devices with the device information communication port of the information storage device.

17 Claims, 10 Drawing Sheets

(51) Int. Cl.
*H04L 12/42* (2006.01)
*H04L 41/12* (2022.01)

(56) References Cited

U.S. PATENT DOCUMENTS

| | | |
|---|---|---|
| 2011/0200049 A1 | 8/2011 | Saegusa et al. |
| 2015/0024797 A1 | 1/2015 | Hasegawa et al. |
| 2015/0078200 A1* | 3/2015 | Kalkunte ............... H04L 45/72 370/254 |
| 2015/0168929 A1* | 6/2015 | Saegusa ................ G05B 15/02 700/19 |
| 2016/0006648 A1* | 1/2016 | Saegusa ............... H04L 47/125 370/236 |
| 2019/0064787 A1* | 2/2019 | Maturana ........... G05B 23/0294 |

FOREIGN PATENT DOCUMENTS

| | | |
|---|---|---|
| EP | 2 367 322 A1 | 9/2011 |
| JP | 2009-77194 A | 4/2009 |
| JP | 2011-166581 A | 8/2011 |
| JP | 5014040 B2 * | 8/2012 |
| JP | 2015-22416 A | 2/2015 |
| JP | 2018-19199 A | 2/2018 |
| JP | 2018-22939 A | 2/2018 |
| WO | WO 2013/183140 A1 | 12/2013 |

OTHER PUBLICATIONS

Japanese-language Written Opinion (PCT/ISA/237) issued in PCT Application No. PCT/JP2019/000868 dated Apr. 2, 2019 (three (3) pages).
Supplementary European Search Report issued in European Application No. 19764498.2 dated Nov. 11, 2021 (nine (9) pages).
Chinese-language Office Action issued in Chinese Application No. 201980008352.2 dated Sep. 3, 2021 (five (5) pages).
Chinese-language Office Action issued in Chinese Application No. 201980008352.2 dated Dec. 17, 2021 (12 pages).

* cited by examiner

DISTRIBUTED CONTROL SYSTEM AND COMMUNICATION CONTROL METHOD THEREFOR

TECHNICAL FIELD

The present invention relates to a distributed control device for controlling the entire system with multiple units and a communication technique therefor.

BACKGROUND ART

In industrial devices such as biochemistry and immunoassay devices, it is general to form an analog transmission path from multiple centrally managed control boards to controlled devices such as sensors and motor shafts mounted on the devices. In such industrial devices, recently, there is a demand for a technique that maintains device control performance while minimizing a length of the analog transmission path by modularizing the control boards and arranging the control boards in a distributed manner in order to improve cost competitiveness through enhancement of efficiency of device design, manufacturing, and maintenance, and to improve the device reliability. Furthermore, in order to enhance the efficiency of design, manufacturing, and maintenance, not only the distribution of the control boards but also a mechanism that can store operation logs before and after the occurrence of an abnormality and reliably aggregate the operation logs in a specific device is required in order to accurately and safely deal with the abnormality in the controlled devices such as motor shafts and sensors.

As a means for solving these, a technique of applying a distributed control device using a network to an electronic system of a device, supplementarily adding a measurement device measuring a device state or a communication path to the distributed control device, and maintaining performance of control processing to be performed by a system is generally known, and examples thereof include JP 2015-22416 A (PTL 1) and the like. A communication system of this example includes multiple field devices connected to a field network that takes and gives device information and information on an environmental state and a controller that controls the field devices by communicating with the field devices via the field network. The field device communicates with the controller via the field network, and performs a predetermined process using information obtained by communication among the field devices via a control-related local network to be performed by the system.

CITATION LIST

Patent Literature

PTL 1: JP 2015-22416 A

SUMMARY OF INVENTION

Technical Problem

In the technique described in PTL 1, however, when the controller, which is a master station of communication, collects the device information, the device information is collected in an upstream direction via the control-related local network, and thus, only the processing load of the control-related communication is reduced, but there is no consideration regarding maintaining of real-time performance.

Solution to Problem

As one aspect, a distributed control system of the present invention has: a central processing device; a central communication device; multiple terminal communication devices each having at least one controlled device connected thereto; an information storage device; and a network having a tree structure comprising multiple communication paths between the central communication device and the terminal communication devices, between the terminal communication devices, and between the terminal communication devices and the information storage device. The central communication device is provided with a normal communication port. The terminal communication devices are each provided with an upstream-side communication port and a downstream-side communication port. The information storage device is provided with a device information communication port. The network is provided with: a first communication path for connecting the upstream-side communication port of a terminal communication device with the downstream-side communication port of a terminal communication device and for connecting the upstream-side communication port of a terminal communication device with the normal communication port of the central communication device; and a second communication path for connecting between the downstream-side communication ports of terminal communication devices positioned at edges of the network and for connecting the downstream-side communication ports of the terminal communication devices with the device information communication port of the information storage device.

Further, a communication control method for a terminal communication device according to the present invention, as one aspect, is a communication control method for a terminal communication device, which includes: an upstream-side communication port that communicates with an upstream-side communication device of a network; a downstream-side communication port that communicates with a downstream-side communication device of the network; and an input/output port to which a controlled device is connected, and includes: transmitting a first packet, which includes information input from the controlled device, from the upstream-side communication port to the upstream-side communication device when receiving a packet including a first command; transmitting a second packet, which includes device information of the terminal communication device, from the downstream-side communication port to the downstream-side communication device when receiving a packet including a second command; determining whether communication based on a packet is communication in a downstream direction or communication in an upstream direction when receiving the packet including information; transferring the received packet from the upstream-side communication port to the upstream-side communication device when determining that the communication is in the upstream direction; determining whether the packet is a packet addressed to an own device when determining that the communication is in the downstream direction; writing the information included in the received packet to the information storage unit when the received packet is addressed to the own device; and transferring the received packet from the downstream-side communication port to the downstream-side communication device when the received packet is not addressed to the own device.

The present specification encompasses the contents disclosed in Japanese Patent Application No. 2018-043409 from which the present application claims priority.

Advantageous Effects of Invention

According to one aspect of the present invention, it is possible to exclusively execute the communication for collection of the device information and the main control-related communication in parallel, and to maintain the real-time performance of the control-related communication.

Further, the collected device information is aggregated in one place, and the information can be easily downloaded and applicable.

Other objects, configurations, and effects which have not been described above become apparent from embodiments to be described hereinafter.

DESCRIPTION OF EMBODIMENTS

Hereinafter, embodiments of the present invention will be described with reference to the drawings.

First Embodiment

Figure 1:
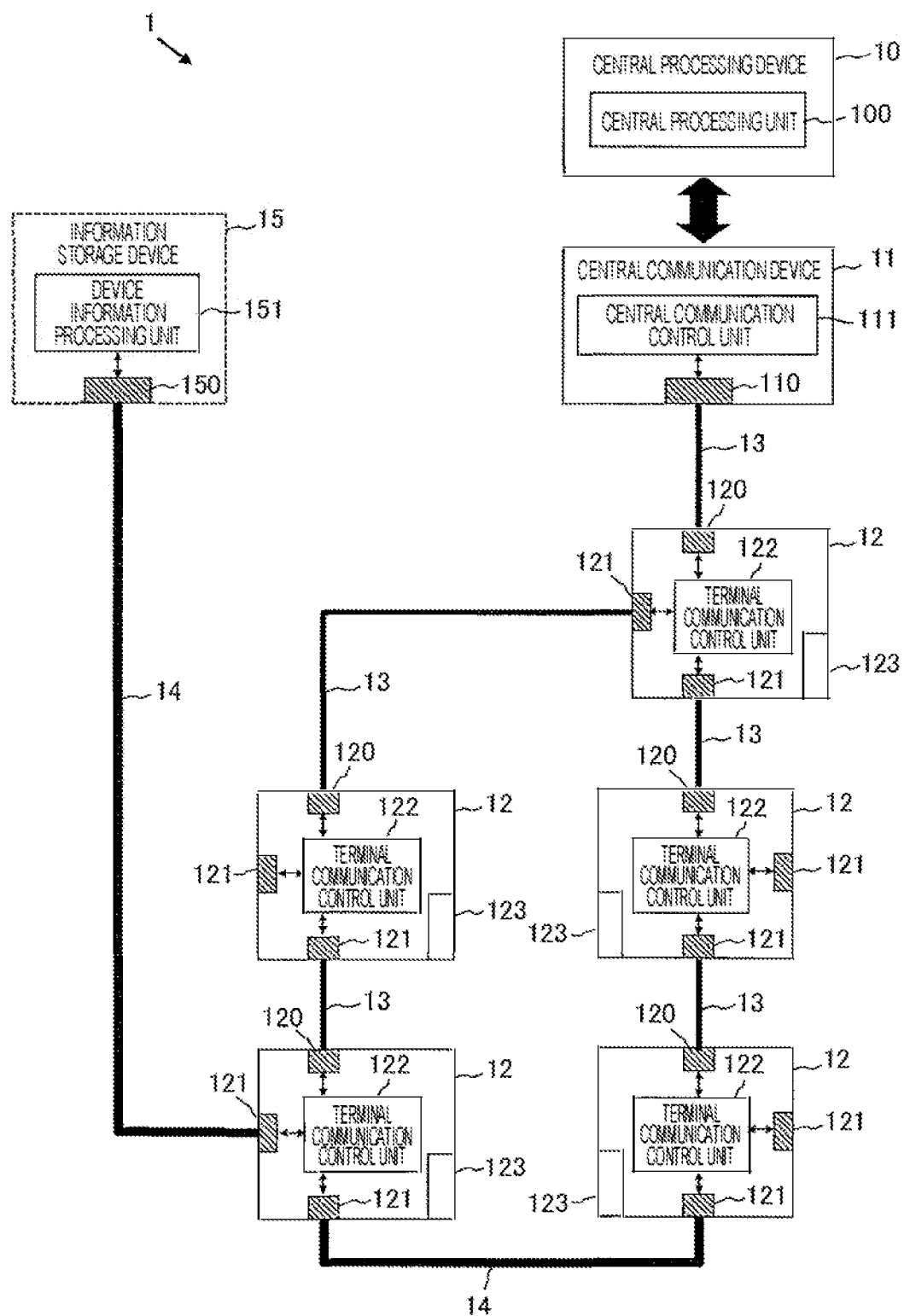
FIG. 1 is a diagram illustrating a configuration example of a distributed control system.

FIG. 1 is a diagram illustrating a configuration example of a distributed control system according to the present embodiment.

A distributed control system 1 includes a central processing device 10, a central communication device 11, multiple terminal communication devices 12, and an information storage device 15. The central processing device 10 is connected to the central communication device 11, and includes a central processing unit 100 that executes a control operation. The central communication device 11 is connected to multiple terminal communication devices 12 by a network having a tree structure, and executes overall management of communication control as a master station for communication in the distributed control system 1. The terminal communication device 12 is connected to the central communication device 11, another terminal communication device 12, or the information storage device 15 via the network, and communicates with the central communication device 11 or the information storage device 15. The information storage device 15 is connected to the terminal communication device 12 and stores device information such as error information and a system log of the distributed control system 1. The device information includes information on a normal state and an abnormal state of communication executed by the distributed control system 1 or a controlled device connected to the distributed control system 1.

Next, a configuration of each device will be described.

The central communication device 11 is provided with a normal communication port 110 and a central communication control unit 111 that controls communication of the distributed control system 1. The terminal communication device 12 is provided with an upstream-side communication port 120, a downstream-side communication port 121, a terminal communication control unit 122 that executes communication control, and an input/output port 123 connecting a controlled device to be controlled by control processing of the distributed control system 1. The upstream-side communication port 120 is connected to the normal communication port 110 of the central communication device 11 or the downstream-side communication port 121 of the other terminal communication device 12, and the downstream-side communication port 121 is connected to the upstream-side communication port 120 of the other terminal communication device 12 or the information storage device 15. The information storage device 15 is provided with a device information communication port 150 connected with a downstream-side communication port 121 of the terminal communication device 12, and a device information processing unit 151 that interprets and stores received information. Incidentally, the information storage device 15 may be mounted on or connected to the central communication device 11.

Further, the distributed control system 1 includes multiple normal communication paths 13 and device information communication paths 14. The normal communication path 13 connects between the normal communication port 110 of the central communication device 11 and the upstream-side communication port 120 of the terminal communication device 12 or between the downstream-side communication port 121 of the terminal communication device 12 and the upstream-side communication port 120 of the other terminal communication device 12. The device information communication path 14 connects the downstream-side communication port 121 of the terminal communication device 12 positioned at an edge of the network to the downstream-side communication port 121 of the other terminal communication device 12 similarly positioned at the edge of the network, or to the device information communication port 150 of the information storage device 15.

Next, a basic operation of communication in the distributed control system 1 will be described.

Figure 2:
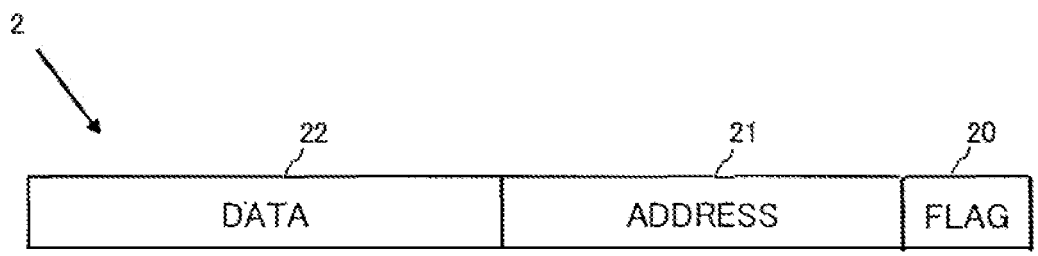
FIG. 2 is a view illustrating an example of a data structure.

The distributed control system 1 uses, for example, a structure of a packet 2 illustrated in FIG. 2 as a data structure for transmission and reception on the network. The packet 2 has: a flag portion 20 that stores information for determination of a type of packet, information for determination of an upstream direction and a downstream direction of communication, and the like; an address portion that indicates each destination of the terminal communication devices 12 provided in the distributed control system 1; and a data portion 22 that stores information to be used for control of the distributed control system 1 and the device information. Here, different addresses are assigned to the multiple terminal communication devices 12, respectively.

Further, the distributed control system 1 performs normal communication for transmitting data necessary for control processing of the controlled device and device information communication for transmitting an operation log of the distributed control system 1. Furthermore, the communication of the distributed control system 1 includes communication in the downstream direction in which information is transferred from the terminal communication device 12 on the upstream side of the central communication device 11 or the network to the other terminal communication device 12 on the downstream side, and communication in the upstream direction in which information is transferred from the multiple terminal communication devices 12 to the central communication device. Examples of a communication scheme include an individual communication scheme in which a specific terminal communication device 12 is designated by an address and a broadcast scheme in which the central communication device 11 communicates with the multiple terminal communication devices 12 simultaneously.

Further, the normal communication is executed on a network path constituted by all the normal communication paths 13, and the device information communication is executed by a network path constituted by all the normal communication paths 13 and all the device information communication paths 14. The normal communication path and the device information communication path are connected by a serial communication line such as a LAN cable and a USB cable. Further, as the network topology, the multiple and different terminal communication devices 12 are configured in a tree structure or a series connection with respect to the central communication device 11.

Next, details of each device will be described.

Figure 3:
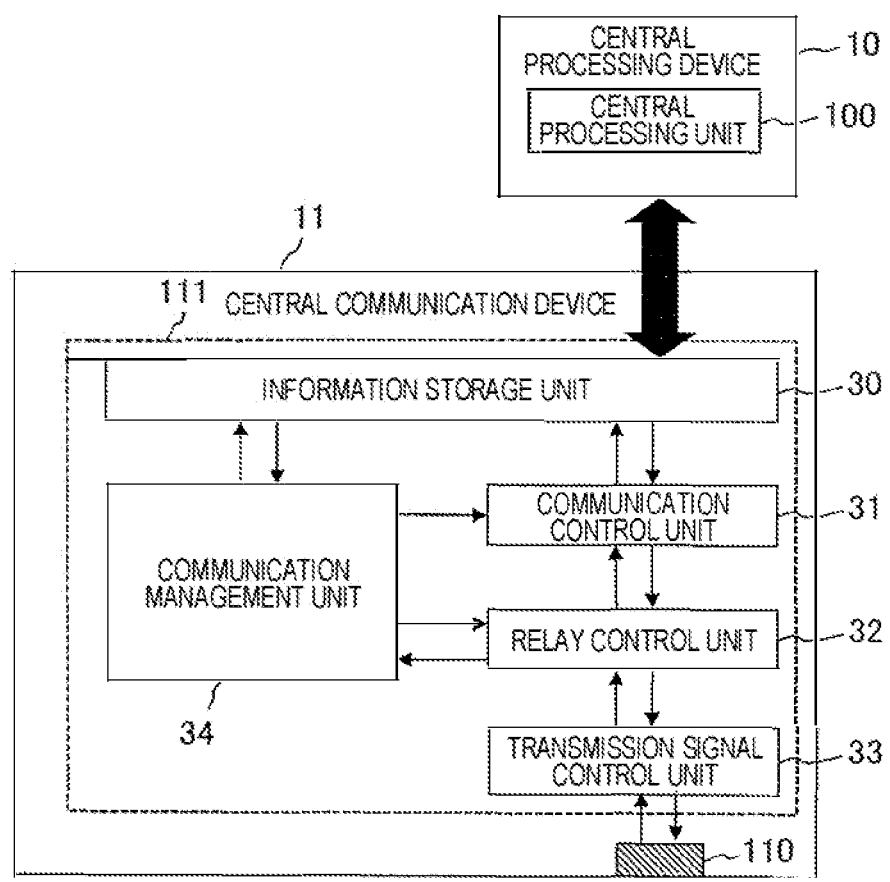
FIG. 3 is a schematic diagram illustrating details of a central communication control unit of a central communication device.

FIG. 3 is a schematic diagram illustrating details of the central communication control unit 111 of the central communication device 11.

First, the configuration of the central communication control unit 111 will be described. The central communication control unit 111 includes an information storage unit 30, a communication control unit 31, a relay control unit 32, a transmission signal control unit 33, and a communication management unit 34. The information storage unit 30 is connected to the central processing device 10 and stores the packet 2 of the normal communication executed on the normal communication path 13. The communication control unit 31 is connected to the information storage unit 30, the communication management unit 34, and the relay control unit 32, and controls a sequence of communication input and output. The relay control unit 32 is connected to the communication management unit 34, the communication control unit 31, and the transmission signal control unit 33, and coordinates input and output of the packet 2 with respect to the communication management unit 34 or the communication control unit 31. The transmission signal control unit 33 is connected to the relay control unit 32 and the normal communication port 110, and converts the packet 2 used for communication into a transmission signal or from the transmission signal into the packet 2. The communication management unit 34 is connected to the information storage unit 30, the communication control unit 31, and the relay control unit 32, and performs overall management of detection of a communication state of the network connected via the central communication device 11 or the terminal communication device 12, communication path information, or an abnormal state of the distributed control system.

Next, a basic operation of the central communication control unit 111 will be described.

First, a reception operation of the central communication device 11 will be described.

The entire information handled by the central communication control unit 111 is managed as the communication management unit 34 or the communication control unit 31 reads or writes the information from or to the information storage unit 30. When the central communication device 11 receives information, an electrical signal is first input to the transmission signal control unit 33. When the transmission signal is input through the normal communication port 110, the transmission signal control unit 33 converts the transmission signal into the packet 2. The relay control unit 32 allocates the packet 2 converted by the transmission signal control unit 33 to the communication control unit 31 or the communication management unit 34 based on the flag portion 20 of the packet 2. Each of the communication control unit 31 and the communication management unit 34 to which the packet 2 has been allocated interprets the received information and writes the information in the information storage unit 30.

Next, a transmission operation of the central communication device 11 will be described.

The communication control unit 31 selects information to be transmitted from the information storage unit 30, and transfers the packet 2 to the relay control unit 32. Alternatively, the communication management unit 34 transfers the packet 2 such as command information for all the terminal communication devices 12 to the relay control unit 32. When the packet 2 is transferred from the communication management unit 34 or the communication control unit 31, the relay control unit 32 sets the communication in the downstream direction in the flag portion 20 of the packet 2, and sequentially transfers the packet 2 to the transmission signal control unit 33. When the packet 2 is transferred from the relay control unit 32, the transmission signal control unit 33 converts the packet 2 into a transmission signal and executes the transmission of the packet 2. Incidentally, a detailed communication method of the central communication device 11 will be described later with reference to FIG. 6.

The distributed control system 1 cyclically repeats the reception operation and the transmission operation at a fixed time, and performs a control operation, thereby controlling a target device of the distributed control system 1. Specifically, the central processing device 10 processes the next cycle control using the contents of the data portion 22 acquired by the central communication device 11 by the reception operation and stored in the information storage unit 30 as an argument. At this time, information included in the data portion 22 of the packet 2 as the argument is a measurement value of a sensor or the like connected to the distributed control system 1. After the operation is completed, the central processing device 10 stores an operation result in the information storage unit 30. Thereafter, the central communication device 11 transmits the operation result stored in the information storage unit 30 as the packet 2 to an arbitrary terminal communication device 12 as the transmission operation. At this time, information included in the data portion 22 of the packet 2 is a thrust value for an actuator connected to the distributed control system 1.

Figure 4:
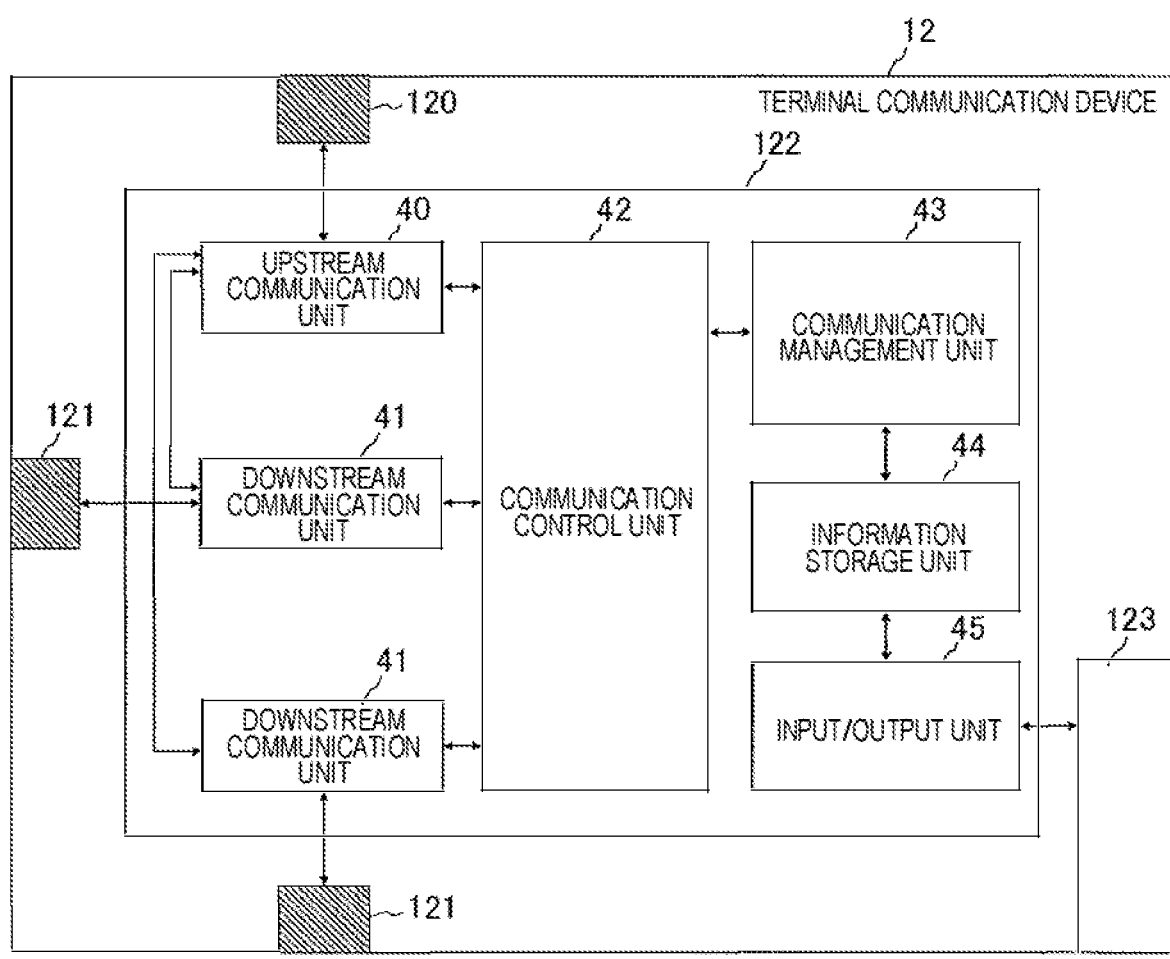
FIG. 4 is a diagram illustrating details of a terminal communication control unit included in a terminal communication device.

FIG. 4 is a diagram illustrating details of the terminal communication control unit 122 included in the terminal communication device 12. The terminal communication control unit 122 includes an upstream communication unit 40, a downstream communication unit 41, a communication control unit 42, a communication management unit 43, an information storage unit 44, and an input/output unit 45. The upstream communication unit 40 is connected to the upstream-side communication port 120, the downstream communication unit 41, and the communication control unit 42, and converts a transmission signal, mutually transmitted and received to and from the other terminal communication device 12 or the central communication device 11, into the packet 2. The downstream communication unit 41 is connected to the downstream-side communication port 121, the upstream communication unit 40, and the communication control unit 42, and converts a transmission signal transmitted and received to and from the other terminal communication device 12 into the packet 2, or relays the transmission signal from the upstream communication unit 40 to the downstream-side communication port 121. The communication control unit 42 is connected to the upstream communication unit 40, the downstream communication unit 41, and the communication management unit 43, and controls the transfer of the packet 2 to be transmitted and received. The communication management unit 43 is connected to the communication control unit 42 and the information storage unit 44, and interprets the transmitted or received packet 2 and manages information on a communication error and information on a communication state of its own terminal communication device 12. The input/output unit 45 is connected to the input/output port 123 and the information storage unit 44, and manages input and output to and from a controlled device connected to the terminal communication device 12.

First, a reception operation of the terminal communication device 12 will be described.

In the case of the reception at the upstream-side communication port 120 in the terminal communication device 12 during the communication in the downstream direction, the upstream communication unit 40 converts a transmission signal into the packet 2 and transfers the packet 2 to the communication control unit 42 or any of the downstream communication units 41. The communication control unit 42 interprets the packet 2 transferred from the upstream communication unit and transfers information of the packet 2 to the communication management unit 43. The communication management unit 43 performs writing in the information storage unit 44 according to the information of the packet 2 transferred from the communication control unit 42.

Next, a transmission operation of the terminal communication device 12 will be described.

The communication management unit 43 transfers control information from a controlled device connected to the input/output port 123 selected from the information storage unit 44, information selected from the information storage unit 44, system management information and error information, or each information of an operation log of the terminal communication device 12 to the communication control unit 42. The communication control unit 42 converts the information transferred from the communication management unit 43 into the packet 2 and transfers the packet 2 to the upstream communication unit 40 or the downstream communication unit 41. At this time, the communication control unit 42 sets the communication in the upstream direction or the downstream direction in the flag portion 20 of the packet 2. Incidentally, a detailed communication control sequence of the terminal communication device 12 will be described separately with reference to FIG. 6.

Figure 5:
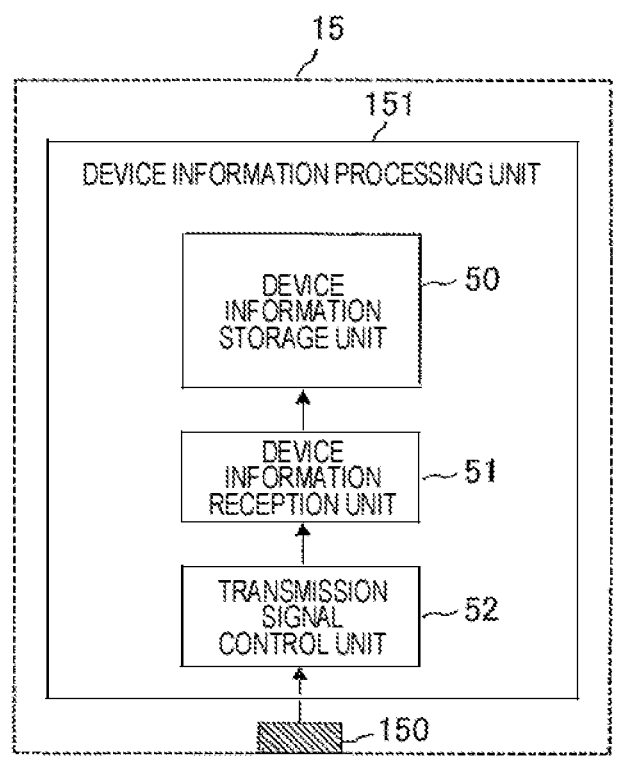
FIG. 5 is a diagram illustrating details of a device information processing unit of an information storage device.

FIG. 5 is a diagram illustrating details of the device information processing unit 151 of the information storage device 15. The device information processing unit 151 is provided with a device information storage unit 50, a device information reception unit 51, and a transmission signal control unit 52. The device information storage unit 50 is connected to the device information reception unit 51, and stores the packet 2 transmitted by the terminal communication device 12 and handled on the device information communication path 14. The device information reception unit 51 is connected to the device information storage unit 50 and the transmission signal control unit 52, interprets the received packet 2, and inputs the data to the device information storage unit 50. The transmission signal control unit 52 is connected to the device information communication port 150 and the device information reception unit 51, and converts a transmission signal into the packet 2.

The packet 2 of the device information transmitted by the terminal communication device 12 is received as a transmission signal at the device information communication port 150, and the transmission signal control unit 52 converts the transmission signal into the packet 2 and transfers the packet 2 to the device information reception unit 51. The device information reception unit 51 interprets the received packet 2 and stores the interpreted data in the device information storage unit 50.

Figure 6:
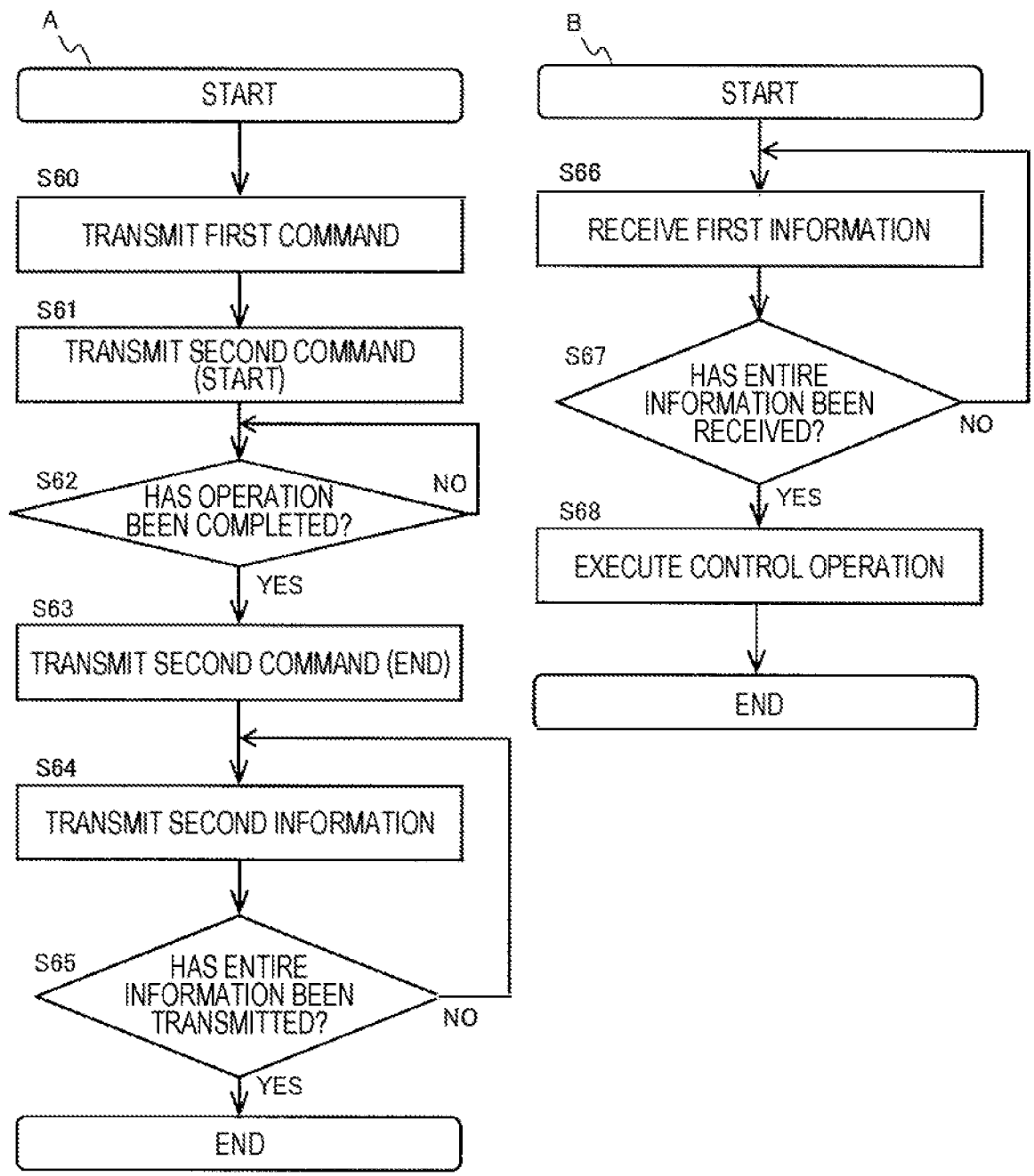
FIG. 6 is a flowchart illustrating a communication control method in the central communication device.

FIG. 6 is a flowchart illustrating a communication control procedure in the central communication device 11. The central communication device 11 executes communication at an arbitrary cycle, and a communication operation for one cycle will be described here. A flowchart A in FIG. 6 illustrates the communication in the downstream direction from the central communication device 11, and a flowchart B illustrates the communication in the upstream direction from the terminal communication device 12.

The central communication device 11 transmits a first command for synchronization of normal communication in S60 to all the terminal communication devices 12 using a broadcast scheme. The synchronization herein is performed for the multiple terminal communication devices 12 connected to the central communication device 11 to issue first information at the same time. At this time, the central communication device 11 transmits the first command as the packet 2. A fact that a type of the packet 2 is a command is set in the flag portion 20 of the packet 2, and specific command contents are stored in the address portion 21 or the data portion 22.

When the processing of S60 is completed, the central communication device 11 simultaneously executes processes in S61 and the subsequent steps and processes in S66 and the subsequent steps. Subsequently to the transmission of the first command, a second command for starting execution of the device information communication is transmitted to all the terminal communication devices 12 using a broadcast method in S61. Further, a plurality of pieces of the first information transferred from the terminal communication device 12 in S66 is received at the same time. At this time, the first information is input information transferred in the upstream direction from the terminal communication device 12, and whether the first information has been received from all the terminal communication devices 12 is determined in S67 every time the first information is received.

If the determination in S67 is affirmative, the received first information is transferred to the central processing device 10, and the control operation is executed in S68. As described above, the operation using the received first information as the argument is executed to calculate the next control value in the control operation. If the determination in S67 is negative, the reception of the first information is executed again. In S62, the device continues to wait for the completion of the control operation being executed in S68.

Meanwhile, the normal communication in the upstream direction and the device information communication in the downstream direction are executed in parallel in the distributed control system 1. Upon completion of the operation of the central processing device 10, the processing proceeds to S63, the second command is transmitted again to all the terminal communication devices 12, the device information communication is terminated, and the processing proceeds to S64. In S64, a plurality of pieces of the second information, which is output information reflecting a result of the control operation, are transmitted to all the terminal communication devices 12 using an individual communication scheme. At this time, whether the transmission of the second information is entirely completed is determined in S65. If the determination is affirmative, one cycle of communication is completed, and the processing returns to the start state. If the determination is negative, the processing proceeds to S64 to continue the transmission of the second information.

The series of processes of the flowchart A and the flowchart B described above is the communication operation executed by the central communication device 11 in one cycle, and the device returns to the start state after completion of the processing.

Figure 7:
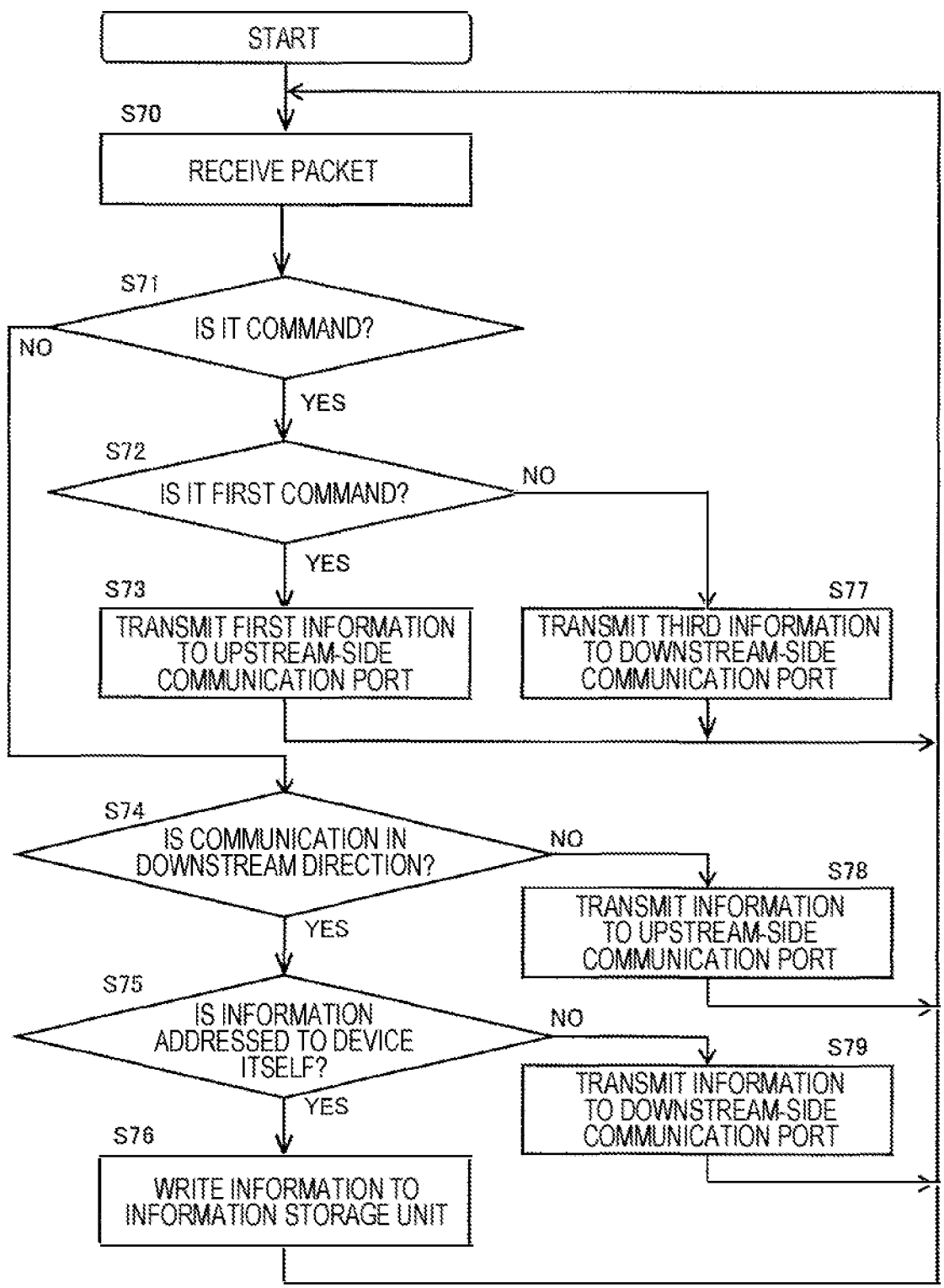
FIG. 7 is a flowchart illustrating a communication control method in the terminal communication device.

Next, a communication operation executed by the terminal communication device 12 will be described. FIG. 7 is a flowchart illustrating a communication control method in the terminal communication device 12.

The packet 2 transmitted from the central communication device 11 or the other terminal communication device 12 is received in S70, and whether the received packet 2 is the packet 2 including a command or the packet 2 including information is determined in S71. In the present embodiment, the determination on the command or the information is made by referring to the flag portion 20 of the packet 2. Here, the command is any one of the first command and the second command, and the information is any information among the above-described first information and second information, and third information that is device information including an operation log such as a state of the distributed control system 1. When determining that the packet 2 includes the command in S71, whether the command is the first command or the second command is determined in S72. At this time, the first command or the second command can be determined by referring to the address portion 21 or the data portion 22 when a type of the flag portion 20 is the command in the packet 2.

If determining the first command in the determination of S72, the processing proceeds to S73, the packet 2 in which the first information extracted from the information storage unit is stored in the data portion 22 is generated, and the first information is transmitted to the central communication device 11 or the terminal communication device 12 in the upstream direction. At this time, information indicating the communication in the upstream direction is set in the flag portion 20 of the packet 2. If determining the second command in the determination of S72, the processing proceeds to S77, the packet 2 in which the third information (device information) extracted from the information storage unit 44 is stored in the data portion 22 is generated and transmitted to the terminal communication device 12 in the downstream direction. At this time, information indicating the communication in the downstream direction is set in the flag portion 20 of the packet 2.

If it is determined in S71 that the packet 2 includes no command, that is, if it is determined that the packet 2 includes information, the processing proceeds to S74, and either the communication in the upstream direction or the communication in the downstream direction is determined by referring to the flag portion 20 of the packet 2. If it is determined that the communication is in the upstream direction in S74, the processing proceeds to S78, and the received packet is transferred to the other terminal communication device 12 in the upstream direction. If it is determined that the communication is in the downstream direction in S74, the processing proceeds to S75, and an address portion of the received packet 2 is confirmed to determine whether the information is addressed to the own device. If it is determined in S75 that the received information is addressed to the own device, the processing proceeds to S76, and the received information is written in the information storage unit 44. If it is determined in S75 that the received information is not addressed to the own device, the processing proceeds to S79, and the received packet is transferred to the other terminal communication device 12 or the information storage device 15 connected in the downstream direction.

Figure 8:
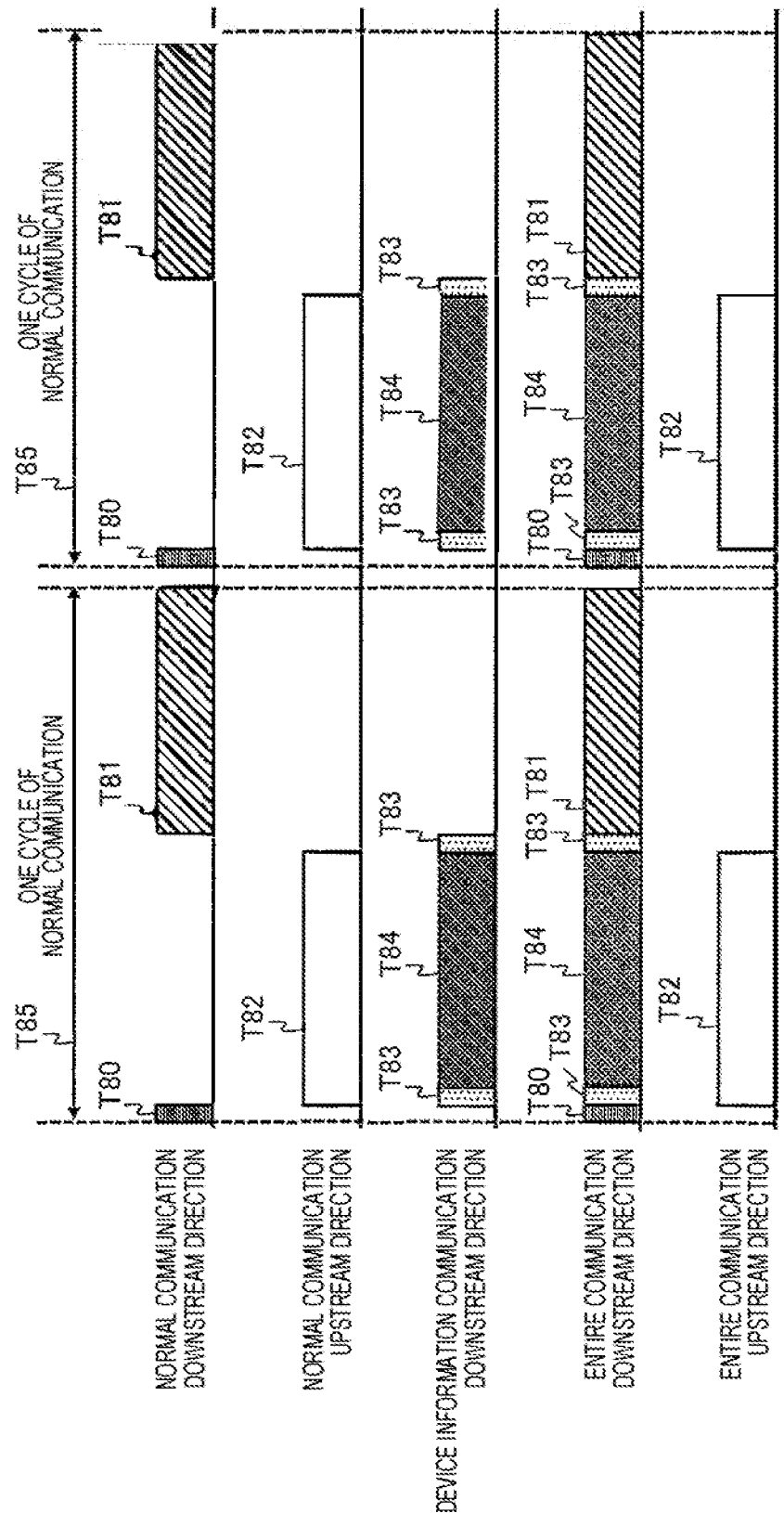
FIG. 8 is a view illustrating a timing chart of the entire communication control.

FIG. 8 is a timing chart in the communication executed by the distributed control system 1.

First, a timing chart of the normal communication will be described. The central communication device 11 transmits the first command in the downstream direction at T80, and executes an input process of receiving the first information transmitted in the upstream direction by the multiple terminal communication devices 12 receiving the first command at T82. At this time, the central communication device 11 executes arithmetic processing after receiving all of the plurality of pieces of first information. Further, upon the completion of the arithmetic processing in the central communication device 11, the communication is switched to the normal communication in the downstream direction again, and an output process of transmitting the second information to the individual terminal communication devices 12 is executed at T81. Here, T85 is the time for one cycle of the normal communication in the distributed control system 1, and the distributed control system 1 continues to control sensors and actuators by constantly executing the series of processes described above at T85.

On the other hand, the device information communication is executed at T83 and T84 in parallel with the normal communication in the upstream direction executed at T82. Here, at T83, the second command for execution of the device information communication is transmitted in the downstream direction. Furthermore, the multiple terminal communication devices 12 receiving the second command transmit the device information as the third information in the downstream direction at T84.

When each of the terminal communication devices 12 transfers the device information in the downstream direction, the device information is transferred to the downstream-side communication port 121 of the terminal communication device 12 itself. That is, all the pieces of device information are finally transferred to all the terminal communication devices positioned at edges of the network connected to the distributed control system 1. Therefore, a final storage location of the device information can be set in either the information storage device 15 or an arbitrary terminal communication device 12 positioned at the edge of the network.

According to an aspect of the present embodiment, it is possible to execute the collection of the device information in parallel without hindering the execution of the normal communication with high real-time performance required for the control processing to be performed by the distributed control system 1.

Second Embodiment

Figure 9:
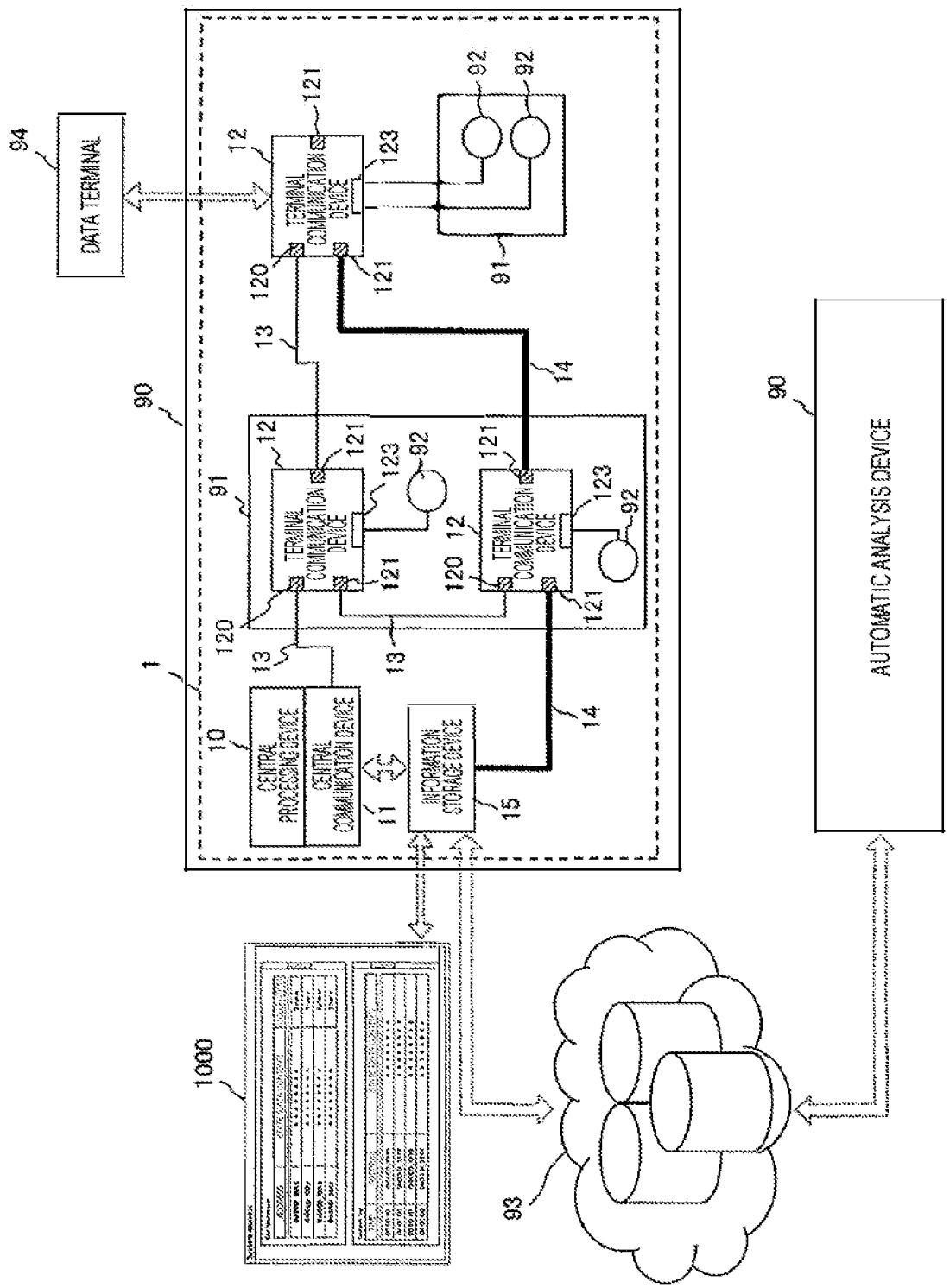
FIG. 9 is a diagram illustrating a configuration example when the distributed control system is applied to an automatic analysis device.

FIG. 9 is a diagram illustrating a configuration example when the distributed control system described in the first embodiment is applied to an automatic analysis device.

An automatic analysis device 90 includes: a device unit provided with multiple controlled device 92 such as actuators and sensors configured to measure blood components and infectious diseases in a sample or perform biochemical analysis and immunoassay; and the distributed control system 1 that performs overall control of all the controlled devices 92.

The distributed control system 1 is provided with: the central processing device 10 that controls the entire control sequence of the distributed control system 1 and transmits a control command based on the control sequence; the central communication device 11 that is connected to the central processing device 10 and gives and takes the control command transmitted from the central processing device 10; and the multiple terminal communication devices 12 that are connected to the controlled devices 92 and performs control processing of the connected controlled devices 92. Further, the distributed control system 1 is provided with: the multiple normal communication paths 13 for connecting the terminal communication device 12 and the central communication device 11 or the terminal communication devices 12 to each other to mutually exchange data; and the multiple device information communication paths 14 that connect the terminal communication devices 12 positioned at the edge of the network to each other or the terminal communication device 12 positioned at the end of the network and the information storage device 15, and forms the network having the tree structure.

Further, the automatic analysis device 90 controls the controlled device 92 such as an actuator and sensor to be controlled using normal communication of the distributed control system 1. The central communication device 11 transmits the first command to the multiple terminal communication devices 12 connected to the network. When receiving the first command, the terminal communication device transmits a value measured by a liquid level detection sensor or a camera sensor, that is, information input from the controlled device to be controlled by the distributed control system from the terminal communication device 12 to the central communication device 11 as first information. The central communication device 11 transfers the received first information to the central processing device 10, and the central processing device 10 calculates the next control information using the first information as an argument. The central communication device 11 transmits the calculated control information to each of the terminal communication devices 12 as second information. In the terminal communication device 12 that has received the second information, which is information output to the controlled device to be controlled by the distributed control system, the received second information is used to control the connected controlled device, for example, the actuator such as a pulse motor and a servo motor.

Further, device information communication for collection of third information, that is, device information, is executed in parallel with normal communication in the distributed control system 1. At this time, a method for executing the device information communication is the same as the method described in the first embodiment, and thus, the description thereof is omitted. Further, the information handled as the device information in the case of executing the device information communication is, for example, information such as a measurement log of a temperature sensor or the like, control abnormality information of a controlled device, or the like in the second embodiment.

Figure 10:
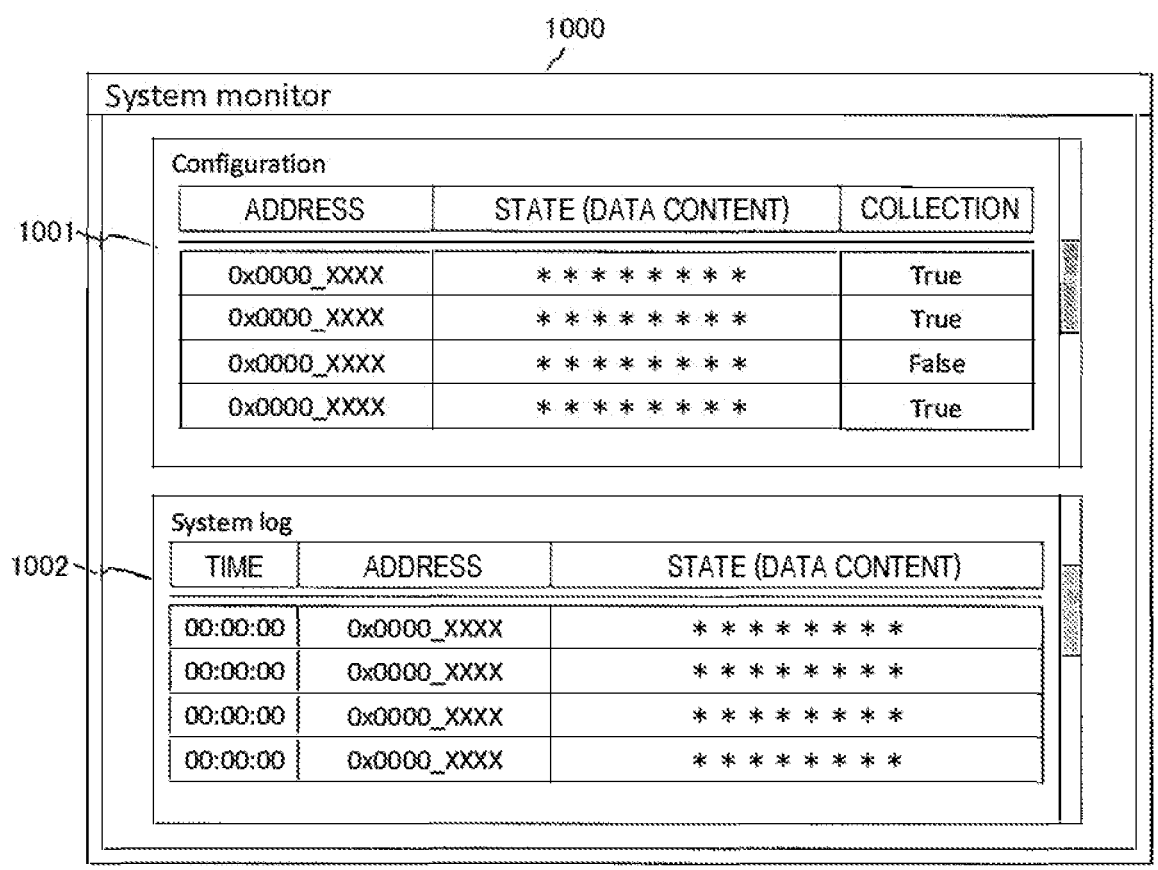
FIG. 10 is a view illustrating a display example on a display device.

Here, an operation of the distributed control system 1 will be described. An arbitrary terminal communication device 12 positioned at the edge of the network or the information storage device 15 is arranged at a place where a display device 1000 can be easily connected in the assembly and operation of the device, and the display device 1000 is connected to the information storage device 15. Here, the display device 1000 will be described in detail. FIG. 10 is a view illustrating a display example of the display device 1000 configured to confirm the device information collected in the information storage device 15 in the distributed control system 1 according to the present embodiment. The display device 1000 is provided with a setting window 1001 and a log monitoring window 1002. The setting window 1001 has a function of setting the device information collected in the device information communication using an address for each of the terminal communication devices 12. The log monitoring window 1002 has a function of displaying data contents corresponding to the address to be collected and the time at which the information is acquired, in the setting of the setting window 1001. In the setting window 1001, the device information to be collected is transferred to the information storage device 15 as the packet 2 by execution of the device information communication, and the information storage device 15 stores the received packet 2. The log monitoring window 1002 can always monitor the stored device information, that is, operation log of the distributed control system 1. The information that has been set in the setting window 1001 is reflected in the communication management unit 43 of the terminal communication device 12, and information that needs to be transmitted in the device information communication is selected and transmitted. Further, the device information issued in the device information communication includes information on network communication of the distributed control system 1, each state of the sensors and actuators connected to the terminal communication device 12, an abnormality, and the like.

Returning to FIG. 9 again, the operation of the device information collected by the automatic analysis device 90 will be described. The distributed control system 1 is connected to other different automatic analysis devices 90 via a network server 93 and shares information with each other. Furthermore, it is also possible to connect the automatic analysis device 90 to a data terminal 94 outside the device and to acquire the device information.

According to the present embodiment, it is possible to share the device information of the automatic analysis device 90 or easily acquire the device information via the network, and it is possible to enhance the efficiency of state analysis and maintenance of the automatic analysis device 90. Other effects obtained in the case of applying the distributed control system 1 are similar to those of the first embodiment.

Third Embodiment

Figure 11:
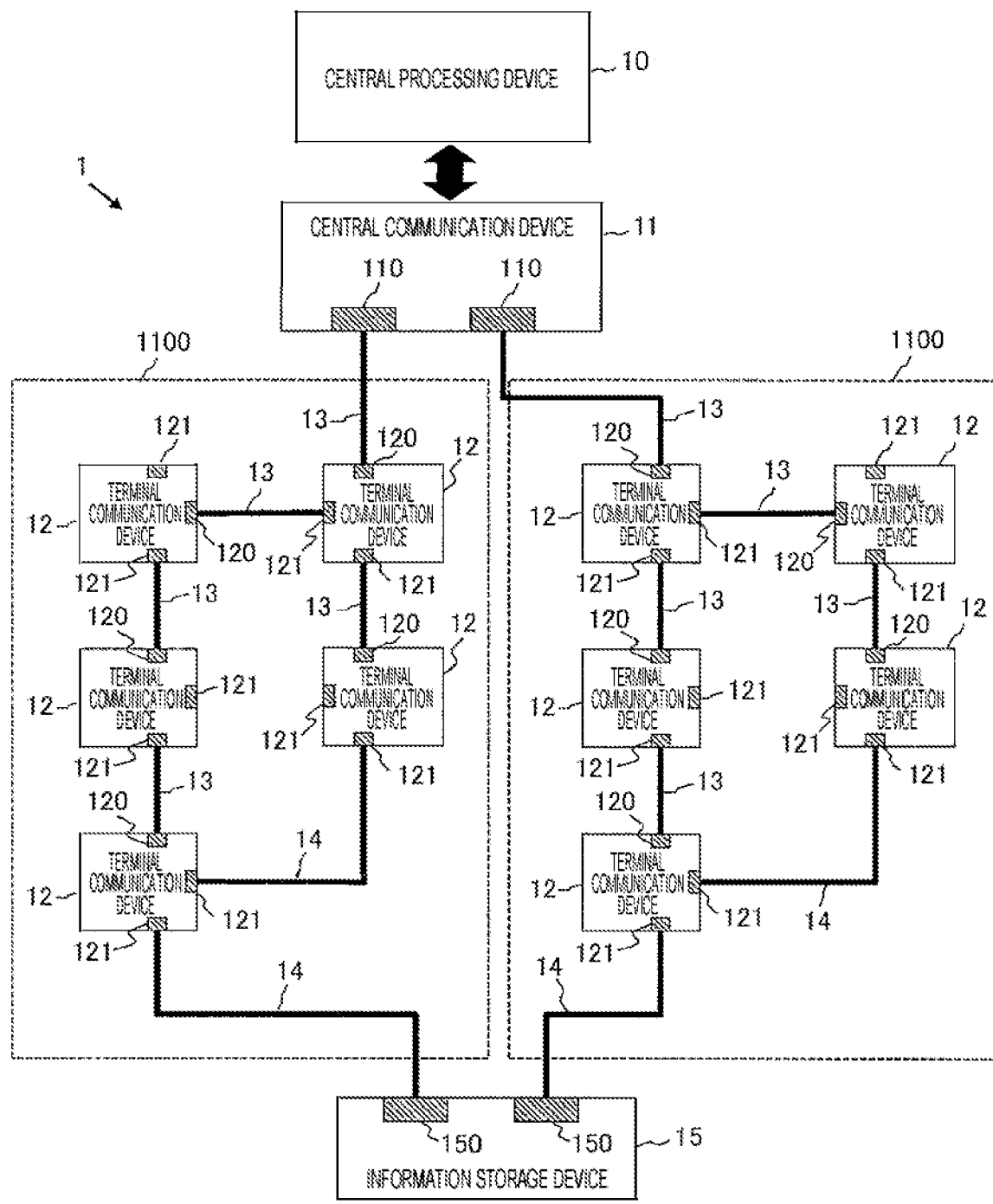
FIG. 11 is a configuration diagram illustrating another example of the distributed control system.

FIG. 11 is a configuration diagram illustrating another example of the distributed control system according to the present embodiment, which is an example illustrating expansion of the network.

The distributed control system 1 includes the central processing device 10, the central communication device 11, the terminal communication devices 12, and the information storage device 15. The central processing device 10 is connected to the central communication device 11 and executes a control operation. The central communication device 11 is a master station for communication of the distributed control system 1, is connected to multiple terminal communication devices 12, and executes overall management of communication control. The terminal communication device 12 is connected to the central communication device 11, another terminal communication device 12, or the information storage device 15, and communicates with the central communication device 11 or the information storage device 15. The information storage device 15 is connected to the terminal communication device 12 and stores error information and a system log of the distributed control system 1.

In the distributed control system 1 of the present embodiment, the central communication device 11 is provided with the multiple normal communication ports 110, and network systems 1100 are connected to the normal communication ports 110, respectively. The network system 1100 has the same configuration as the device configuration described in the first embodiment, and the multiple terminal communication devices 12 are connected via the multiple normal communication paths 13 or device information communication paths 14.

On the other hand, the information storage device 15 is provided with the multiple device information communication ports 150, and can be connected to the multiple terminal communication devices 12 positioned at edges of the respective network systems 1100 via the device information communication paths 14.

According to the present embodiment, the distributed control system 1 can be expanded in response to the required performance of a target device. Other effects obtained in the case of applying the distributed control system 1 are similar to those of the first embodiment.

Incidentally, the invention is not limited to the above-described embodiments and includes various modifications. For example, the above-described embodiments have been described in detail in order to describe the present invention in an easily understandable manner, and are not necessarily limited to one including the entire configuration that has been described above. Further, some configurations of a certain embodiment can be substituted by configurations of another embodiment, and further, a configuration of another embodiment can be also added to a configuration of a certain embodiment. Further, addition, deletion or substitution of other configurations can be made with respect to some configurations of each embodiment.

Further, a part or all of each of the above-described configurations, functions, processing units, processing means, and the like may be realized, for example, by hardware by designing with an integrated circuit and the like. Further, each of the above-described configurations, functions, and the like may also be realized by software by causing a processor to interpret and execute a program for realizing each of the functions. Information such as programs, tables, and files that realize the respective functions can be installed in a storage device such as a memory, a hard disk, and a solid state drive (SSD), or a storage medium such as an IC card, an SD card, and a DVD.

Further, only a control line and an information line considered to be necessary for the description have been illustrated, and all control lines and information lines required for a product are not illustrated. It may be considered that most of the configurations are practically connected to each other.

REFERENCE SIGNS LIST 1 distributed control system
2 packet
13 normal communication path
14 device information communication path
20 flag portion
21 address portion
22 data portion
90 automatic analysis device
91 device unit
92 controlled device
93 network server
120 upstream-side communication port
121 downstream-side communication port
123 input/output port
150 device information communication port
1000 display device
1001 setting window
1002 log monitoring window
1100 network system All publications, patents and patent applications cited herein are hereby incorporated by reference in their entirety.

The invention claimed is:
1. A distributed control system comprising:
a central processing device;
a central communication device;
multiple terminal communication devices each having at least one controlled device connected thereto;
an information storage device; and
a network having a tree structure comprising:
   multiple communication paths between the central communication device and the multiple terminal communication devices;
   multiple communication paths between the multiple terminal communication devices; and
   multiple communication paths between the multiple terminal communication devices and the information storage device;
wherein:
   the central communication device is provided with a normal communication port;
   the multiple terminal communication devices are each provided with an upstream-side communication port and a downstream-side communication port;
   the information storage device is provided with a device information communication port and is arranged separately from the central processing device, the central communication device, and the multiple terminal communication devices in the distributed control system; and
   the network is provided with:
      a first communication path for connecting the upstream-side communication port of a terminal communication device with the downstream-side communication port of a terminal communication device and for connecting the upstream-side communication port of a terminal communication device with the normal communication port of the central communication device; and
      a second communication path for connecting between the downstream-side communication port of each of the multiple terminal communication devices positioned at edges of the network and for connecting the downstream-side communication port of each of the multiple terminal communication devices with the device information communication port of the information storage device.

2. The distributed control system according to claim 1, wherein the terminal communication device transmits device information in a downstream direction of the network using the first communication path and the second communication path.

3. The distributed control system according to claim 1, wherein the terminal communication device transmits information input from the at least one controlled device in an upstream direction of the network using the first communication path.

4. The distributed control system according to claim 1, wherein the terminal communication device performs transmission of device information in a downstream direction of the network using the first communication path and the second communication path and transmission of information input from the at least one controlled device in an upstream direction of the network using the first communication path in parallel.

5. The distributed control system according to claim 1, wherein the central communication device transmits information to be output to the at least one controlled device of each of the multiple terminal communication devices using the first communication path.

6. The distributed control system according to claim 2, wherein
the device information is transmitted to any of the multiple terminal communication devices connected to the second communication path, and
the information storage device is connected to any of the multiple terminal communication devices connected to the second communication path.

7. The distributed control system according to claim 1, wherein
the central communication device transmits a first command, which causes first information that is information input from each controlled device of the multiple terminal communication devices, to be transmitted to the central communication device simultaneously,
the central communication device transfers the first information to the central processing device when receiving the first information,
the central processing device generates second information that is information to be output to each controlled device of the multiple terminal communication devices based on the first information, and transfers the second information to the central communication device,
the central communication device transmits the second information to the multiple terminal communication devices,
the central communication device transmits the first command, and then, transmits a second command, which causes third information that is device information to be transmitted to the terminal communication device, and
the terminal communication device transmits the third information in a downstream direction of the network when receiving the second command.

8. The distributed control system according to claim 1, wherein the central processing device is provided with a central processing unit that performs an operation related to control processing to be performed by the distributed control system.

9. The distributed control system according to claim 1, wherein the central communication device is provided with:
a transmission signal control unit that converts a transmission signal and information;
a relay control unit that coordinates input and output of information;
a communication control unit that controls communication;
a communication management unit that manages detection of a communication state of the network, communication path information, or an abnormal state of the distributed control system; and
an information storage unit that stores information transmitted and received by the communication.

10. The distributed control system according to claim 1, wherein the terminal communication device is provided with:
an input/output port that connects the at least one controlled device;
an upstream communication unit that is connected to the upstream-side communication port and converts a transmission signal and information;
a downstream communication unit that is connected to the downstream-side communication port and converts a transmission signal and information;
a communication control unit that executes communication control of the network;
a communication management unit that manages a communication state of the terminal communication device;
an information storage unit that stores information transmitted and received by communication; and
an input/output unit that is connected to the input/output port and manages input and output to and from the at least one controlled device.

11. The distributed control system according to claim 1, wherein the information storage device is provided with:
a transmission signal control unit that is connected to the device information communication port and converts a transmission signal into information;
a device information reception unit that interprets information received by the transmission signal control unit; and
a device information storage unit that stores device information.

12. The distributed control system according to claim 1, wherein a plurality of networks are connected to the central communication device.

13. The distributed control system according to claim 1, wherein
the information storage device includes a plurality of device information communication ports, and
the second communication path is connected to each of the device information communication ports.

14. An automatic analysis device comprising the distributed control system according to claim 7,
wherein the automatic analysis device is connected to another automatic analysis device or a different device via a server connected to the network to share the device information.

15. A communication control method for a terminal communication device arranged in a distributed control system including: a central processing device, a central communication device, and an information storage device;
the terminal communication device including:
an upstream-side communication port that communicates with an upstream-side communication device of a network;

a downstream-side communication port that communicates with a downstream-side communication device of the network;
and an input/output port to which a controlled device is connected;
the network having a tree structure comprising:
multiple communication paths between the central communication device and the terminal communication device;
multiple communication paths between the terminal communication device and the upstream-side communication device and the downstream-side communication device;
and multiple communication paths between the terminal communication device and the information storage device;
the communication control method comprising:
transmitting a first packet, which includes information input from the controlled device, from the upstream-side communication port to the upstream-side communication device when receiving a packet including a first command;
transmitting a second packet, which includes device information of the terminal communication device, from the downstream-side communication port to the downstream-side communication device when receiving a packet including a second command;
determining whether communication based on a packet is communication in a downstream direction or communication in an upstream direction when receiving the packet including information;
transferring the received packet from the upstream-side communication port to the upstream-side communication device when determining that the communication is in the upstream direction;
determining whether the received packet is a packet addressed to an own device when determining that the communication is in the downstream direction;
writing the information included in the received packet to the information storage unit that is arranged separately from the central processing device, the central communication device, and the terminal communication device in the distributed control system when the received packet is addressed to the own device; and
transferring the received packet from the downstream-side communication port to the downstream-side communication device when the received packet is not addressed to the own device.

16. The communication control method for a terminal communication device according to claim 15, wherein the transmission of the second packet, the transfer of the received packet to the upstream-side communication device, and the transfer of the received packet to the downstream-side communication device are executed in parallel.

17. The communication control method for a terminal communication device according to claim 15, wherein information indicating that the communication is in the upstream direction is set in the first packet, and information indicating that the communication is in the downstream direction is set in the second packet.

* * * * *